July 23, 1963   R. W. PAGE   3,098,299
DRILLING INSTRUMENT

Filed Aug. 12, 1957   2 Sheets-Sheet 1

INVENTOR
RICHARD W. PAGE
BY
*[signature]*
ATTORNEY.

July 23, 1963 R. W. PAGE 3,098,299
DRILLING INSTRUMENT
Filed Aug. 12, 1957 2 Sheets-Sheet 2
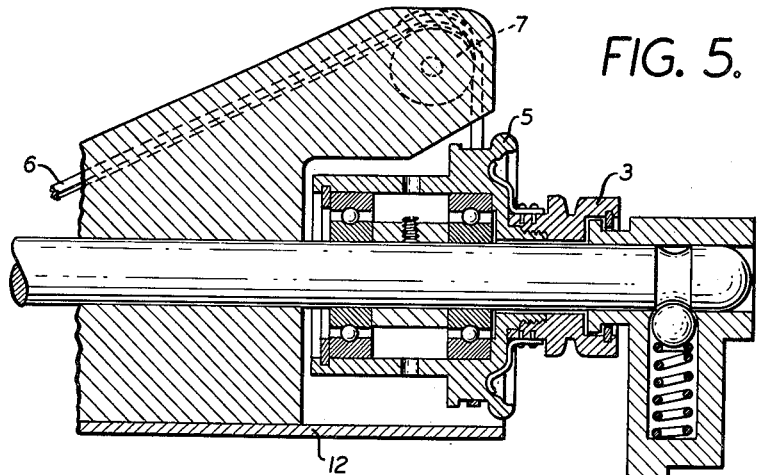
FIG. 5.
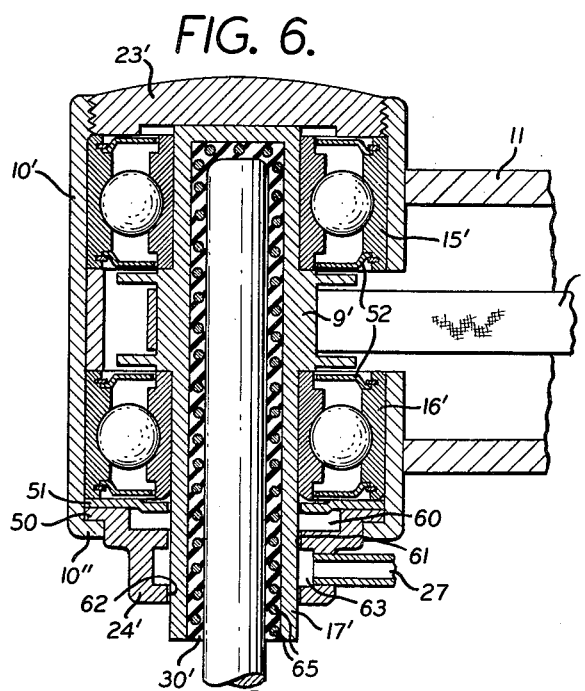
FIG. 6.
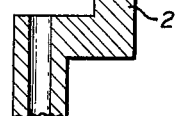
FIG. 7.
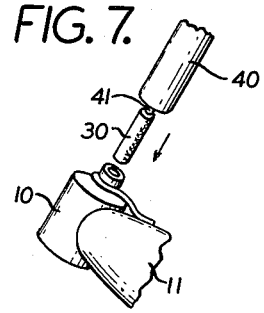
FIG. 8.
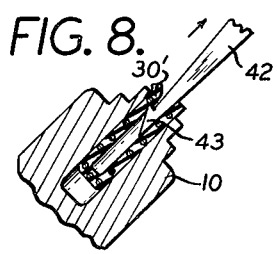
FIG. 9.
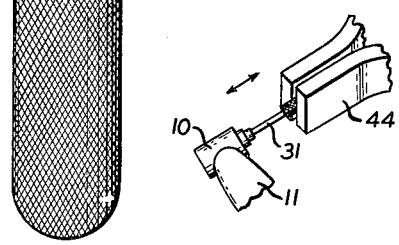
INVENTOR
RICHARD W. PAGE
BY
ATTORNEY

United States Patent Office 3,098,299
Patented July 23, 1963

3,098,299
DRILLING INSTRUMENT
Richard W. Page, 307 Quaker Road, Chappaqua, N.Y.
Filed Aug. 12, 1957, Ser. No. 677,669
4 Claims. (Cl. 32—27)

This invention relates to drilling instruments, and more particularly to dental drills and to the drill holding elements or chucks thereof.

It is an object of the invention to provide an improved chuck for holding a dental drilling burr.

Another object of the invention is to provide an improved seal for a drilling head, which protects the bearings against the entrance of water and dental detritus.

The present invention is a continuation-in-part of my previous application, Serial No. 534,037, filed September 13, 1955 for Dental Drill, now Patent No. 2,824,370, and is directed particularly to the chuck drilling head and sealing features of that application and to certain improvements thereon.

A drilling instrument embodying the invention in a preferred form will now first be described with reference to the accompanying drawing, and the features forming the invention will then be pointed out in the appended claims.

In the drawing:

FIG. 5 is an enlarged section on the line 5—5 of FIG. 2;

FIG. 6 is a view similar to FIG. 3, but showing a modified form of the invention;

FIG. 7 is an isometric showing the manner of inserting the chuck in the instrument drilling head;

FIG. 8 is a sectional view showing the manner of removing a chuck; and

FIG. 9 is an isometric showing the manner of inserting a dental burr in the chuck.

Figure 1:
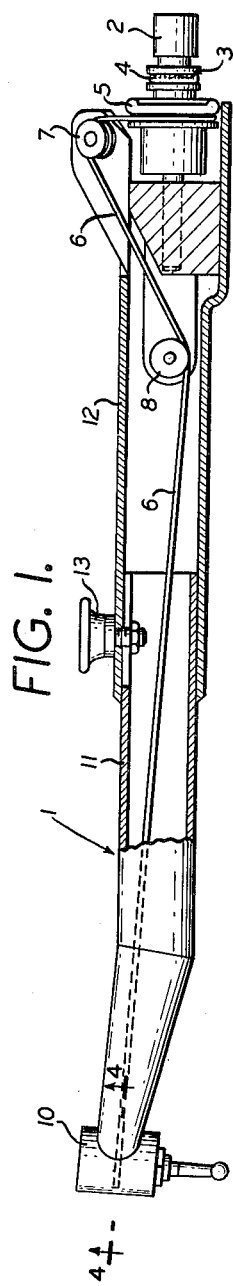
FIG. 1 is a side elevation of a dental contra angle, partly broken away to show internal structure.
Figure 2:
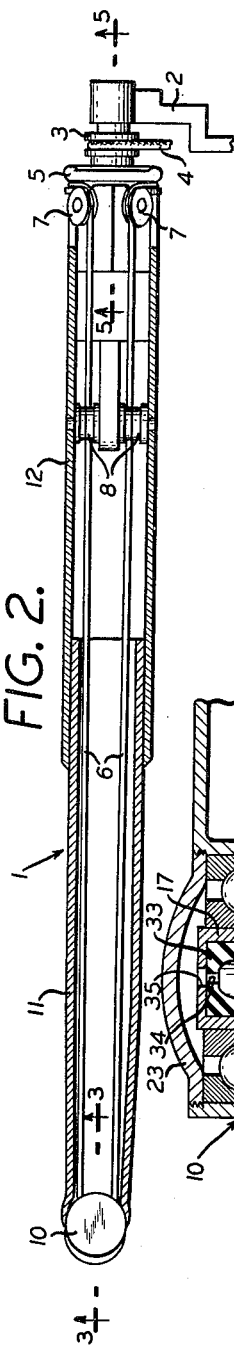
FIG. 2 is a plan view of the instrument of FIG. 1, also broken away to show internal structure.

Referring now to FIGS. 1 and 2, the instrument shown is similar to that shown in the above mentioned application, and will be described herein only to the extent necessary for a full understanding of the present invention.

The contra angle, indicated generally at 1, is pivotally attached to an end fitting 2 which attaches to the engine arm and the contra angle has a pulley 3 driven by the dental engine belt 4 concentric about the pivotal axis of the contra angle. A larger pulley 5 connected to and driven directly by pulley 3 drives the drill through a belt 6 which is guided by suitable guide pulleys 7 and 8 and passes around a driven pulley 9 located in the instrument head 10 for driving the drill. The belt and other parts generally are enclosed in a casing which may be formed in two parts 11 and 12, slidably fitting together and held in adjusted position as by means of a thumb screw 13. This adjustment permits regulating tension of the belt 6.

As will be apparent from the folowing description, the invention is not limited in its broader aspect to pulley drives of the type shown but is applicable generally so far as the chuck and closure features are concerned without reference to the manner in which the belt 6 may be driven. Also, as will be apparent from the following description, the chuck of the invention considered in its broader aspect is applicable also to drill drives regardless of whether the same are of the belt type or any other usual type such as gear driven, electric, pneumatic or hydraulic. The particular drive described above is in general included herein merely for completeness and to illustrate the operation of the invention in a complete manner with respect to one particular type of drive mechanism.

Figure 4:
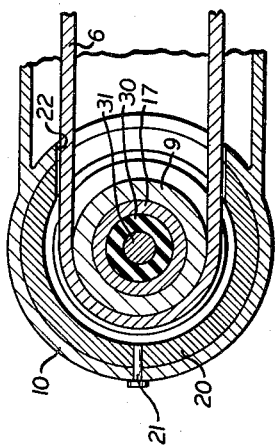
FIG. 4 is an enlarged section on the line 4—4 of FIG. 1.
Figure 3:
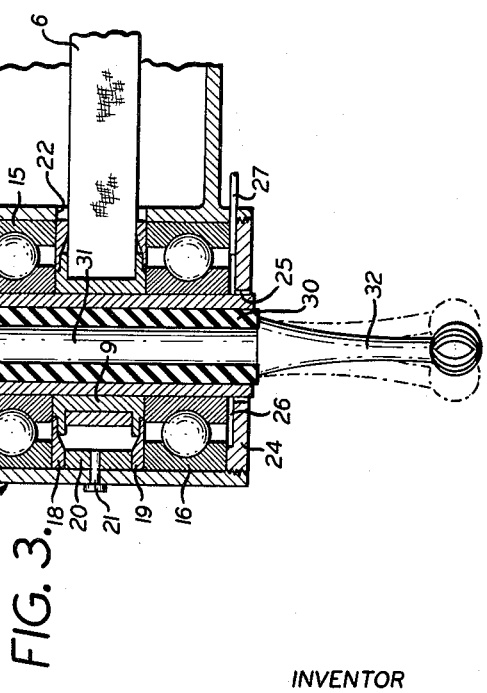
FIG. 3 is an enlarged section on the line 3—3 of FIG. 2.

Referring now particularly to FIGS. 3 and 4 of the drawing, it will be seen that the drilling head of the instrument comprises a generaly cylindrical casing 10, within which are fitted the outer races of a pair of ball bearings 15 and 16, the inner races of which are fitted to and support the tubular shaft element 17. Between the inner races of the bearings 15, 16, there is fitted to the shaft 17 the pulley 9 previously referred to, and between the outer races of the bearings there is fitted a pair of washer elements 18, 19, together with a spacer ring 20 which is held in place within the cylindrical housing 10 by a pin 21. Spacer 20 is interrupted, as indicated in FIG. 4, to permit passage of the belt 6 and the casing 10 has an opening 22 accommodating the belt. Washers 18, 19 and the flanges of pulley 9 interfit as more fully described in the above mentioned application to close off the bearings 15, 16 against the space between bearings, which is in communication with the interior of the casing 11, 12 through the opening 22. The outer races of bearings 15, 16 are located axially of the shaft 17 by a cap 23 and closure plate 24, as indicated. With the chuck of the invention, no opening through the cap 23 is necessary, thus permitting an exceptionally good seal for the operating parts. Shaft 17 passes through a central bore 25 in the plate 24 with operating clearance and without packing at this point. Under dental drilling operating conditions, packing at the point of emergence of the shaft is not very satisfactory in any event unless the entire interior of the drilling head can be packed with grease. In the preferred applications of the drill of the present invention, there is the additional difficulty that the friction involve in any packing and sealing gland at this point is highly objectionable, as the drill may operate at speeds up to about 150,000 r.p.m., at which speeds (and even at much lower speeds) a packing gland or sealing fit may readily develop destructive friction and heat. The sealing plate 24 engages the outer race of bearing 16 peripherally but is formed with an annular recess or depression 26 communicating with the clearance space around shaft 17 and providing an operating clearance between plate 24 and the inner race of bearing 16. Air is supplied to space 26 through tubing 27 during the operation of the drill, so as to maintain a constant outward flow of air through clearance 25, thus preventing ingress of any moisture or grit particles.

It will be observed that the tubular shaft 17, where it passes through the bore 25 is solid and is not split as is the case in most chucks to permit gripping and releasing the drill. This permits establishing once for all the precise desired clearance between bore 25 and shaft 17 so that an accurately defined and known air exhaustion passage is provided, with the maintenance of a very slight pressure in space 26, a sufficient outflow of air will be created to protect the parts against the entry of water or other foreign material.

The tubular shaft 17 contains a sleeve 30 of rubber, nylon, Teflon or any of various synthetic resin materials having suitable characteristics as to resilience and the shank 31 of the burr 32 is frictionally received and held in this resilient chuck element 30. To facilitate insertion of the resilient chuck element 30, it may be formed with a generally closed inner head 33, and this, in turn, may, in some cases, be provided with a small central opening 34 communicating with a small central opening 35 in a similarly closed end of the hollow shaft 17. In certain cases, the openings 34, 35 may be omitted, and in other cases, the resilient member 30 may be a simple tubular element without the enclosed end 33. The precise construction features adopted and particulars just referred to depend upon particular operating conditions which will be discussed in somewhat more detail below.

The resilient chuck element 30 may be inserted, as indicated in FIG. 7, using a tool 40 consisting of a handle carrying a pin 41 slightly smaller than the burr shank 31 and fitting in the resilient sleeve element 30. Using this simple tool, the element 30 may be pushed into the hollow shaft 17, into the position of FIG. 3, and the tool 40 may then be withdrawn, leaving the parts in condition to receive a dental drilling burr. Extraction of an element 30 for replacement is also a simple matter and involves merely the use of an element 42, similar to a crochet needle and having a barb 43. This tool may be pushed into the resilient chuck 30, engaging the barb 43 therein and then extracted, removing a worn or damaged element 30 for replacement by a new part. The insertion of a burr or removal thereof is equally simple and involves merely the gripping of the head of the burr in the jaws 44 (preferably of plastic) or suitable pair of tongs, forcing the shank 31 into the resilient chuck 30 until it bottoms therein. The shank 31 is preferably lubricated slightly, as by using a bit of soap or other convenient lubricant.

A modified and improved form of the invention is shown in FIG. 6. In this arrangement, the casing 10' is constructed much as before and terminates in an inwardly facing flange 10" against which the end closure member 24' is seated and held in position by its periphery 50 engaging in a wall of the casing 10'. Above the member 24' is located a closure plate or washer 51, which may fit closely to the hollow shaft 17', being lapped in use so as to establish an absolute minimum operating clearance between the washer 51 and the shaft 17'. The bearings 15', 16' are similar to those previously described but are provided with their own closure elements 52. The washers 18, 19 may, accordingly, be eliminated and a spacer 20' engages directly against the outer races of the bearings to hold them in spaced relation. The upper cap 23' engages against the outer races of the bearings as before, thus locating these elements, and the pulley 9', here shown as formed integral with the hollow shaft 17', is located by the inner races of the bearings as before, thus holding the tubular shaft 17' in position within the casing.

End plate 24' has an annular recess 60 surrounding the tubular shaft 17' and adjacent the washer 51, which recess is preferably packed with grease. Below the recess 60, the element 24' is formed with a bore 61, 62 accommodating shaft 17' with the required slight clearance and has a further annular recess or chamber 63 between bore sections 61 and 62, which chamber 63 communicates with an air supply line 27, as before. Washer 51 having a relatively close fit to shaft 17' effectively prevents the flowing of grease from the space 60 into the bearings, while the air within chamber 63 provides a continuous exhaust of air between bore 62 and tubular shaft 17' while the drill is operating, thus preventing entry of water and gritty material, as before.

The resilient chuck element 30' is a modified construction, consisting of a tubular structure of wire screen 65 which is molded into rubber or other plastic, filling the space between the screen wires and furnishing relatively smooth inner and outer surfaces for engaging the burr shank 31' and inner walls of the tubular shaft 17', respectively.

What is claimed is:
1. A dental drilling instrument comprising a casing structure, a tubular shaft having one end adapted to receive a drill shank, bearings supported in the casing structure and, in turn, rotatably supporting the tubular shaft, and closure means around the drill shank receiving end of the shaft, the said closure means comprising a washer plate supported in the casing structure adjacent the bearings and closely fitting around the said shaft, means defining a grease chamber adjacent the said washer plate and outwardly thereof, means outwardly of the grease chamber defining an air chamber and including an outer closure member for the air chamber fitting around the shaft with clearance, and means for supplying air under pressure to the air chamber for maintaining a current of air out through the space between the last said member and the tubular shaft during operation of the drill and thereby preventing the entry into the casing of water and gritty material.

2. A dental drilling instrument comprising a casing structure, a tubular shaft having one end adapted to receive a drill shank, bearings supported in the casing structure and, in turn, rotatably supporting the tubular shaft, and closure means around the drill shank receiving end of the shaft, the said closure means comprising a washer plate supported in the casing structure adjacent the bearings and closely fitting around the said shaft with a lapped fit, means defining a grease chamber adjacent the said washer plate and outwardly thereof, means outwardly of the grease chamber defining an air chamber, an outer closure member for the air chamber fitting around the shaft with clearance, and means for supplying air under pressure to the air chamber for maintaining a current of air out through the space between the last said member and the tubular shaft during operation of the drill and thereby preventing the entry into the casing of water and gritty material.

3. A dental drilling instrument comprising a casing structure, a tubular shaft having one end adapted to receive a drill shank, bearings supported in the casing structure and, in turn, rotatably supporting the tubular shaft, and closure means around the drill shank receiving end of the shaft, the said closure means comprising a washer plate supported in the casing structure adjacent the bearings and closely fitting around the said shaft and a closure member having an annular recess defining a grease chamber adjacent the said washer plate and outwardly thereof and a bore outwardly of the grease chamber fitting around the shaft with clearance, the bore having an annular groove intermediate its ends and forming an air chamber around the shaft, and means for supplying air under pressure to the air chamber for maintaining a current of air out through the bore and around the tubular shaft during operation of the drill and thereby preventing the entry into the casing of water and gritty material.

4. A dental drilling instrument according to claim 3, in which the washer plate has a lapped fit around the shaft.

References Cited in the file of this patent
UNITED STATES PATENTS

| 2,180,993 | Monnier | Nov. 21, 1939 |
| 2,608,807 | Nilsen et al. | Sept. 2, 1952 |
| 2,611,960 | Herndon | Sept. 30, 1952 |
| 2,701,914 | Dietrich | Feb. 15, 1955 |
| 2,824,370 | Page | Feb. 25, 1958 |
| 2,917,829 | Page | Dec. 22, 1959 |

FOREIGN PATENTS

| 842,241 | Germany | June 26, 1952 |
| 391,437 | Great Britain | Apr. 12, 1933 |